UNITED STATES PATENT OFFICE.

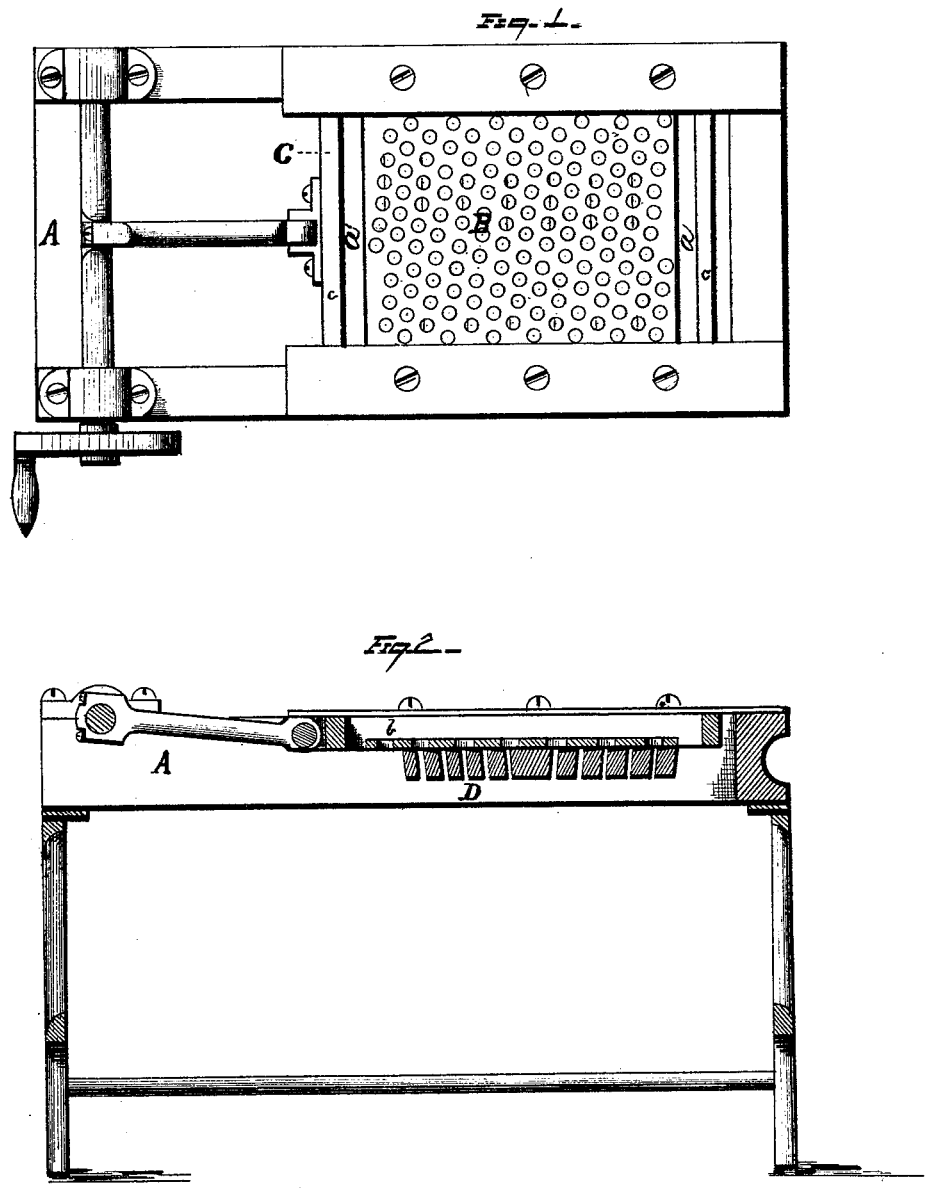

FERDINAND SCHUMACHER, OF AKRON, OHIO.

IMPROVEMENT IN MACHINES FOR MAKING GRAIN GRITS.

Specification forming part of Letters Patent No. 180,797, dated August 8, 1876; application filed July 22, 1876.

*To all whom it may concern:*

Be it known that I, FERDINAND SCHUMACHER, of Akron, in the county of Summit and State of Ohio, have invented certain new and useful Improvements in Grain-Cutters; and I do hereby declare the following to be a full, clear, and exact description of the invention, such as will enable others skilled in the art to which it pertains to make and use it, reference being had to the accompanying drawings, which form part of this specification.

My invention relates to grain-cutters, having for its object such a construction of parts, as an improvement in machines used for cutting wheat and other cereals, as will enable same to dispose of impurities in the grain at an early stage in the operation, and thus obviate the unpleasant results otherwise attendant upon the milling of same.

My invention consists in providing openings or apertures in one or both end extremities of a perforated hopper-bottom plate of suitable dimensions, so as to allow of imperfect seeds, rat-balls, and other accompanying impurities of the grain, to be discharged from the hopper prior to any cutting or subsequent grinding of the grain.

My invention further consists in the arrangement of the series of cutting-knives, according to which arrangement their cutting-edges are presented outwardly from the center of the series, and respectively toward the front and rear ends, as same may be to either side of the center. By this means the material may be passed into a more central part of the hopper, and the grain is evenly fed out through same during the operation of the machine.

Referring to the drawings, Figure 1 is a plan of a machine embodying my invention, and Fig. 2 is a longitudinal section through same.

A is the frame-work of the machine, and may be indefinitely varied to correspond to any wish. B is the bottom plate of the hopper, being in this instance of metal, and having perforations passing vertically through same, of any diameter, so as to admit only the smaller cereals, such as oats, or larger, to correspond with heavier grains, such as wheat. C is the frame of the hopper-plate, in which same is securely embraced and supported. The sides of this frame make a tight joint with the plate B, so as to allow of no escape from the hopper other than at the end extremities, which are constructed so as to give full and ample room for all impurities to escape at such points. These end openings *a a'* are formed by extending the sides *b* of the frame C out beyond the continuance of the bed-plate and there joining them by end strips *c c'*, and thus completing the frame-work, by which means a clear space opening is given between the ends of the hopper-plate and the corresponding parts of the frame; or the plate may be made to extend beyond the frame, and the openings provided by cutting out the lower part of end strips *c c'*. This hopper may be operated by any suitable driving-shaft and connecting mechanism; and the knives may be stationary, or both may conjointly move so as to operate upon the grain. D are knives, secured in the sides of the main frame, below the hopper-plate, but sufficiently near to same to allow their cutting-edges to suitably combine with the plate in cutting the grain; and the openings between the knives are made to vary proportionately with the size of the grain to be operated upon, or the size of the particles into which each several kinds of grain may be desired to be cut. These knives D are constructed with a beveled or inclined back, the plane of such inclination extending from the cutting-edge to the rear of each knife. As each single seed passes vertically through the perforations in the hopper-plate, the lower end of same will stand upon this rear declining surface of one of the knives until the operation of the machine carries this knife out from under it, and brings the following knife at right angles against its side, when the seed is cut and dropped down through. At about the center of the hopper-plate two consecutive knives are placed, reversely to one another, and following, respectively, from each of these two knives to the front and rear extremities of the cutting-frame, the several remaining knives present their cutting-edges correspondingly—that is, all those to the rear of these two reversely-united knives have their cutting-edges presented toward the rear of the machine, while those in the opposite direction from these two reversely-united knives present their cutting-edges toward the front. By thus placing the knives so that from the center of the hopper they shall reversely present their cutting-edges to the grain fed from said hopper, same being horizontally-operating, half the knives are made to cut at each half turn or stroke of the crank, producing more even results thereby in the entire working of the machine. The sound grain and that suitable for the grinding process passes through subjected to the cutting action, while the various impurities are being passed out and off through the end openings at either extremity of the hopper-plate.

It will be understood that I do not in any wise limit myself to the above-described arrangement or construction of the knives in using the foregoing improvement of a hopper constructed with end openings; but a hopper constructed with such end discharges may be used entirely independent from any arrangement or form of knives shown in this application.

The prominent feature of my invention consists, broadly, in the hopper itself, as described, and the reverse arrangement of the knives is an independent and subsidiary matter.

Having fully described my invention, what I claim as new, and desire to secure by Letters Patent, is—

1. The hopper of a grain-cutting machine constructed with end discharges, substantially as and for the purpose described.

2. In a grain-cutting machine, the combination, with the bottom plate of the hopper, of the frame extended out from either end of same, substantially as and for the purpose described.

3. In a grain-cutting machine, the combination, with the hopper, of knives presenting their cutting-edges reversely from the center of the knife-frame, substantially as and for the purpose described.

In testimony that I claim the foregoing I have hereunto set my hand this 18th day of July, 1876.

FERDINAND SCHUMACHER.

Witnesses:
J. S. CARPENTER,
GEO. W. WEEKS.